(12) United States Patent
Kailey et al.

(10) Patent No.: US 11,079,984 B2
(45) Date of Patent: Aug. 3, 2021

(54) IMAGE PROCESSING MECHANISM (71) Applicants: Walter F. Kailey, Frederick, CO (US);
Stephen Mandry, Longmont, CO (US)

(72) Inventors: Walter F. Kailey, Frederick, CO (US);
Stephen Mandry, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 154 days.

(21) Appl. No.: 16/588,551

(22) Filed: Sep. 30, 2019

(65) Prior Publication Data
US 2021/0096784 A1    Apr. 1, 2021

(51) Int. Cl.
G06F 3/12 (2006.01)
G06F 9/52 (2006.01)
G06T 1/20 (2006.01)
H04N 1/00 (2006.01)

(52) U.S. Cl.
CPC .............. *G06F 3/124* (2013.01); *G06F 9/522* (2013.01); *G06T 1/20* (2013.01); *H04N 1/0096* (2013.01)

(58) Field of Classification Search
CPC .......... G06F 3/124; G06F 3/126; G06F 9/522; G06F 9/4881; G06T 1/20; H04N 1/0096
USPC ....................................... 358/1.15
See application file for complete search history.

(56) References Cited

U.S. PATENT DOCUMENTS

| 7,302,199 | B2 | 11/2007 | German et al. |
| 7,760,387 | B2 | 7/2010 | Senda |
| 9,250,848 | B2 | 2/2016 | Morrison et al. |
| 9,367,306 | B2 | 6/2016 | Marathe et al. |
| 2006/0044595 | A1 | 3/2006 | Ferlitsch |
| 2006/0268316 | A1 | 11/2006 | Condon et al. |
| 2008/0055621 | A1 | 3/2008 | Price et al. |
| 2013/0298133 | A1* | 11/2013 | Jones ............ G06F 9/522 718/104 |
| 2013/0305258 | A1 | 11/2013 | Durant |
| 2016/0092407 | A1 | 3/2016 | Ball |
| 2016/0210088 | A1 | 7/2016 | Van Der Branden |
| 2017/0083373 | A1 | 3/2017 | Jones et al. |

OTHER PUBLICATIONS

Extended European Search Report for EP 20192687.0, dated Feb. 25, 2021, 7 pages.

* cited by examiner

*Primary Examiner* — Kent Yip
(74) *Attorney, Agent, or Firm* — Jaffery Watson Mendonsa & Hamilton LLP (57) ABSTRACT A system is disclosed. The system includes at least one physical memory device having a plurality of task queues and a processor to receive print data including a plurality of sheetside images, process one or more of the plurality of sheetside images in parallel via nested task queues, the nested task queues including a first task queue associated with a first set of processing threads and second set of task queues, each associated with a second set of processing threads, each task queue in the second set of task queues corresponding to a thread within the first set of processing threads, wherein execution of tasks via the second set of task queues has a higher priority designation than execution of tasks via the first set of processing threads, which are in the first task queue.

20 Claims, 11 Drawing Sheets

IMAGE PROCESSING MECHANISM

FIELD OF THE INVENTION

The invention relates to the field of printing systems, and in particular, to perform parallel image processing.

BACKGROUND

In commercial and transactional printers, various image processing applications may be performed to process sheetside print data. In such image processing applications, a separate set of intermediate storage buffers are required for each image that is processed in parallel. For instance, decompression of an image followed by halftoning requires one input buffer, one decompression buffer, and one output buffer for each image that is processed in parallel. Similarly, the same amount of separate storage buffers are required to decrypt each image if image data is both encrypted and compressed. Thus, parallel processing of images can require many gigabytes of memory for intermediate storage buffers.

Therefore, to reduce memory size, an image processing pipeline design must limit the number of images being processed in parallel. This limitation does not limit the number of parallel processing threads, because each image may be divided into multiple segments for parallel processing. However, limitation of the number of images simultaneously processed reduces processor utilization due to idle processing threads at the start and end of each processed image, where it becomes necessary to wait for all threads to finish before starting the next image. In fact, the average number of idle processors in such a system will be inversely proportional to the number of simultaneously processed images.

Accordingly, a parallel image processing mechanism utilizing multiple task queues, each of which performs parallel processing upon the segments of a single image, is desired.

SUMMARY

In one embodiment, a method is disclosed. The method includes receiving print data including a plurality of sheetside images and processing two or more of the plurality of sheetside images in parallel via nested task queues, the nested task queues including a first task queue associated with a first set of processing threads and second set of task queues corresponding to the threads of the first task queue, each of which are associated with a further set of processing threads, wherein execution of tasks via the second set of task queues has a higher priority designation than execution of tasks via the first set of processing threads.

BRIEF DESCRIPTION OF THE DRAWINGS

A better understanding of the present invention can be obtained from the following detailed description in conjunction with the following drawings, in which.

DETAILED DESCRIPTION

A mechanism to perform pipelined parallel asynchronous image processing using two or more task queue structures is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "calculator" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
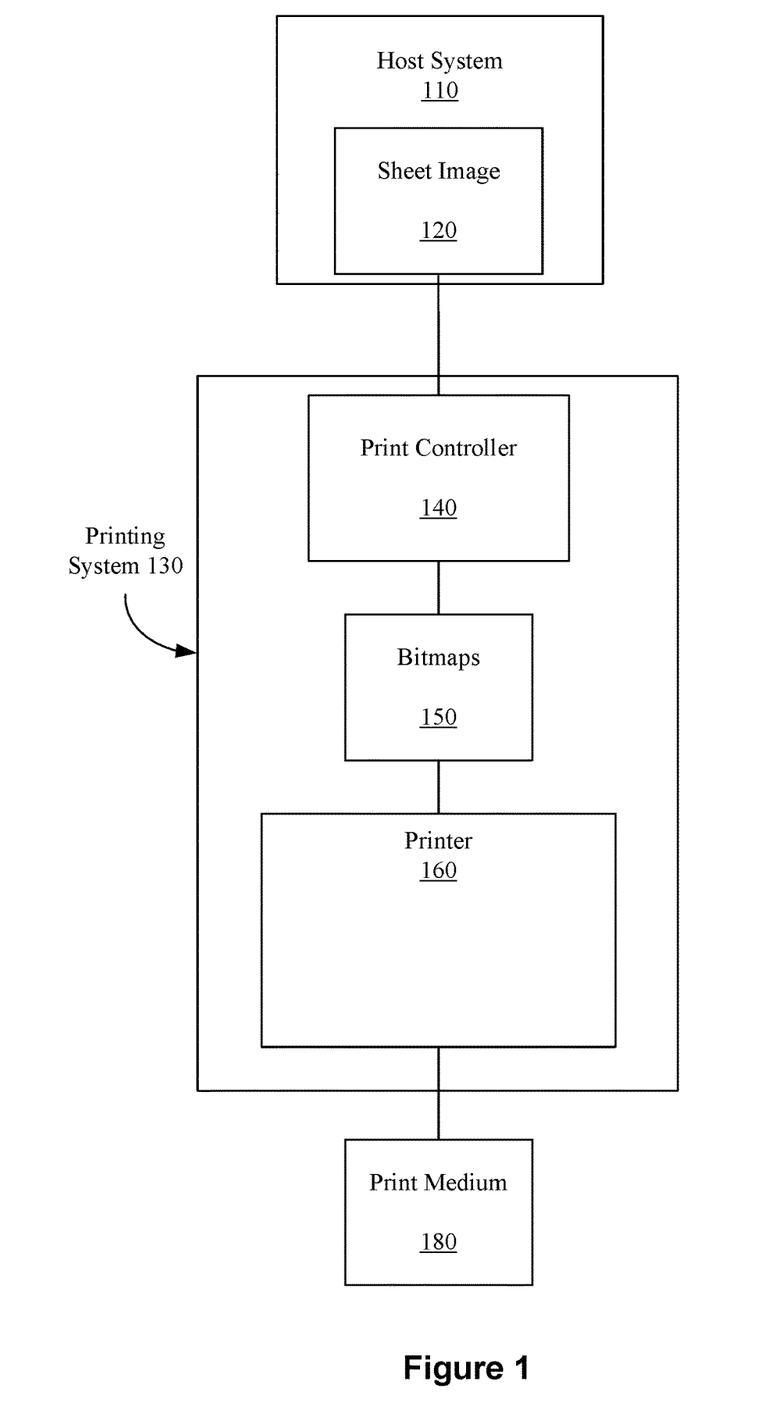
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, cloud infrastructure, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 having one or more print engines to present the bitmap 150 onto the print medium 180 via marking material (e.g., toner, ink, coatings, etc.) based on the sheet image 120.

Print controller 140 and printer 160 may both be implemented in the same printing system 130 or implemented separately and coupled together. In another embodiment, print controller 140 may be implemented in host system 110 and coupled to printer 160. Print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
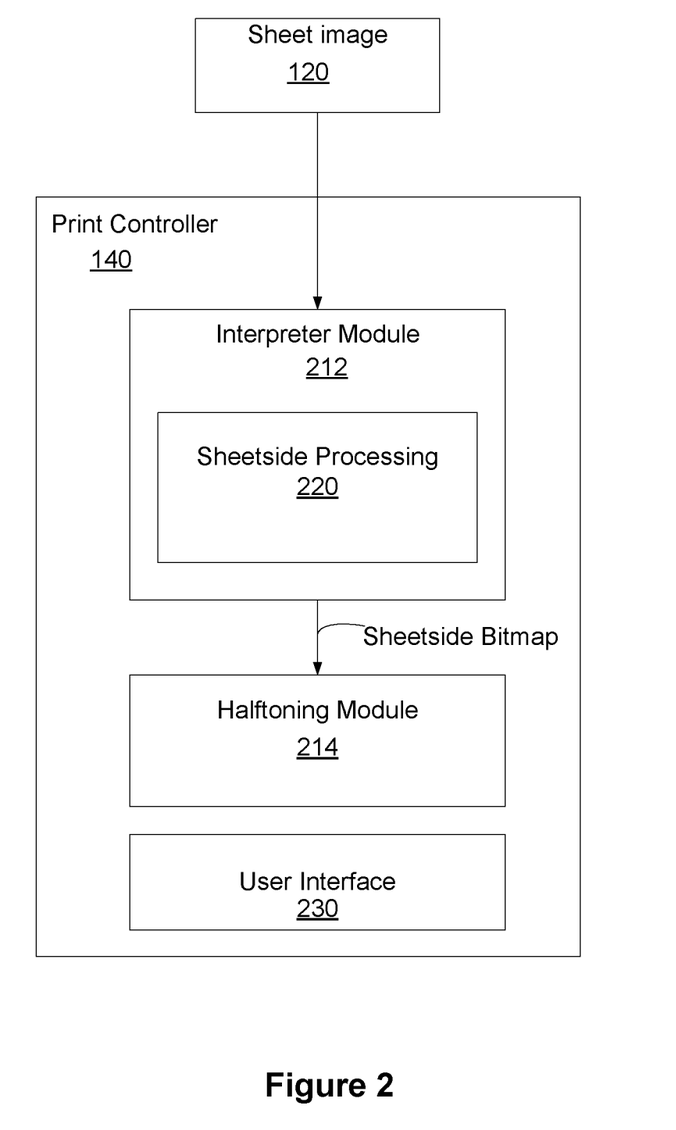
FIG. 2 is a block diagram illustrating one embodiment of a print controller.

FIG. 2 illustrate one embodiment of a print controller 140. As shown in FIG. 2, print controller 140 (e.g., DFE or digital front end), in its generalized form, includes interpreter module 212 and halftoning module 214. Interpreter module 212 is operable to interpret, render, rasterize, or otherwise convert images (e.g., raw sheetside images such as sheet image 120) of a print job into sheetside bitmaps.

The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the entire set of pixels for the image. Interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pixels to halftone patterns of CMYK ink for application to the paper. A halftone design may comprise a pre-defined mapping of input pixel gray levels to output drop sizes based on pixel location.

According to one embodiment, interpreter 212, or halftoning module 214, or both include a sheetside processing 220 to perform pipelined parallel asynchronous processing of sheetside images via nested (e.g., two or more) task queue structures. In such an embodiment, each full sheetside (e.g., page or sheet) is processed via a first task queue structure, with each sheetside subsequently being separated into components that are processed at a second set of task queue structures (or task queues).

In a further embodiment, the components of two or more sheetsides may be processed in parallel at the second set of task queues. Although illustrated as being included within interpreter module 212, other embodiments may implement sheetside processing 220 as a separate component. Still other embodiments may implement sheetside processing 220 within halftoning module 214 or within interpreter module 212 and also within halftoning module 214, depending on processing requirements within halftoning module 214 and interpreter module 212.

Figure 3:
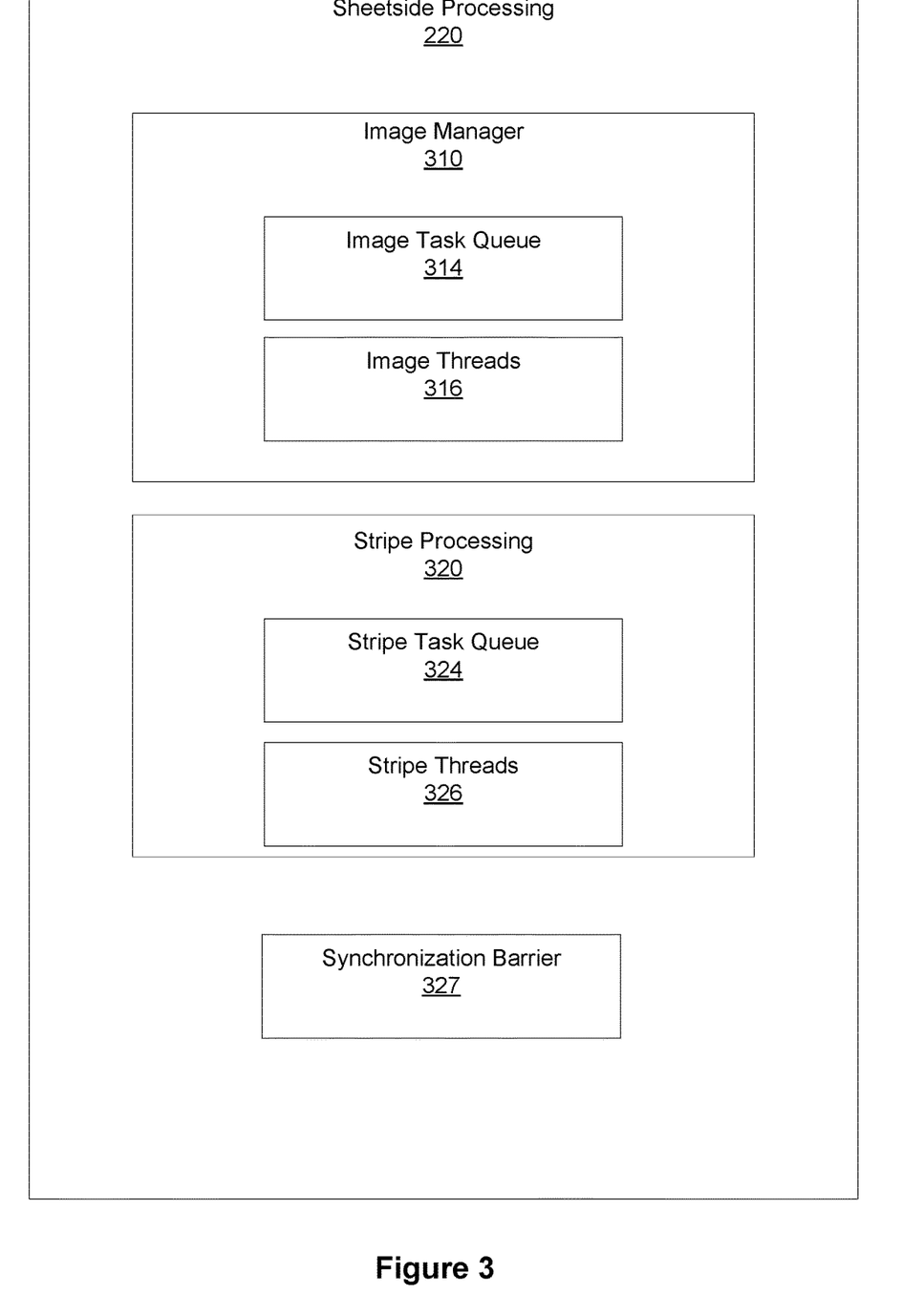
FIG. 3 illustrates one embodiment of a sheetside processing mechanism.

FIG. 3 illustrates one embodiment of a sheetside processing 220, including an image manager 310 and a stripe processing 320. According to one embodiment, image manager 310 detects page/sheet boundaries of each sheetside image (or image) included in print data and generates an image manager task associated with each sheetside image. In one embodiment, a task represents a function pointer to a function to be processed.

Figure 4A:
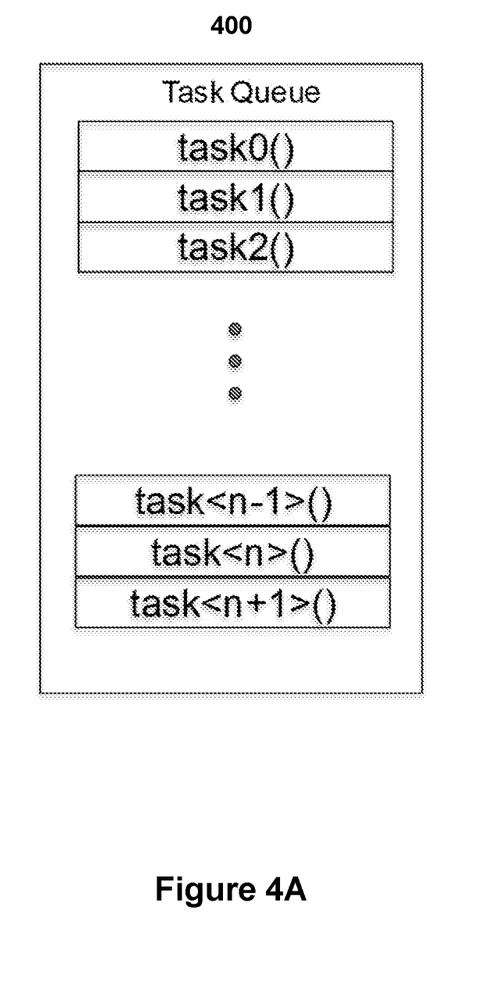
FIG. 4A illustrates one embodiment of a task queue.

In one embodiment, image manager 310 stores each of the generated image manager tasks in an image task queue 314 (e.g., a first task queue) for processing by one of a plurality of image threads 316 (e.g. a first set of processing threads). In one embodiment, image task queue 314 is a first in, first out (FIFO) structure that temporarily store image manager tasks until the tasks can be processed by image threads 316. Thus, execution of image manager tasks by image threads 316 are initiated in an order received at image task queue 314. In another embodiment, image manager 310 assigns a single unique image task in image task queue 314 to each sheetside image. FIG. 4A illustrates one embodiment of a task queue 400 for implementation as image task queue 314.

Figure 4B:
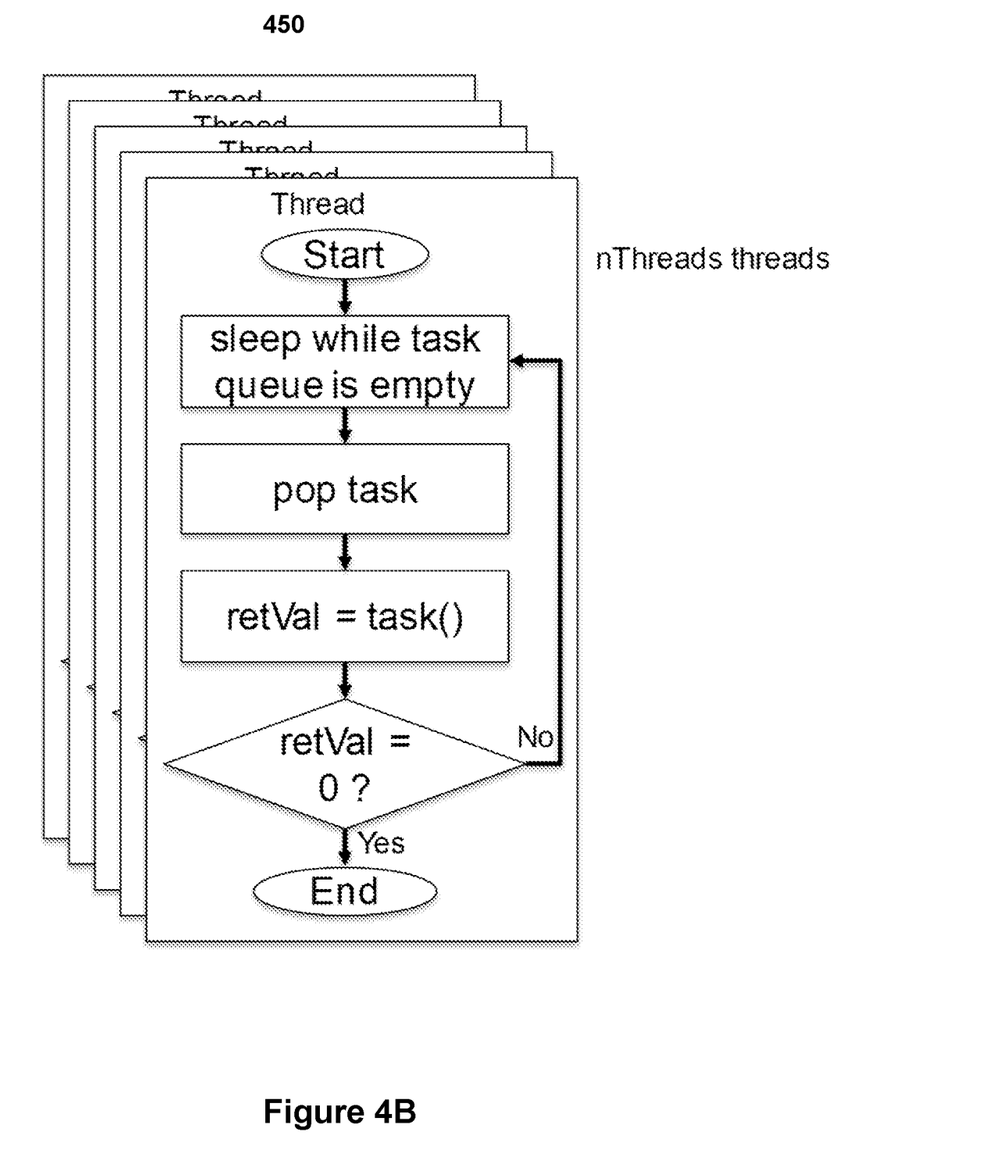
FIG. 4B illustrates one embodiment of processing threads.

In a further embodiment, each image thread 316 retrieves a task from image task queue 314 and calls a function associated with the task. If no task is available for processing, an image thread 316 sleeps until a new task is inserted into image task queue 314. After executing a task, the image thread 316 accesses image task queue 314 to retrieve the next available task and repeats the process. FIG. 4B illustrates one embodiment of a plurality of (e.g., n) processing threads 450 for implementation as image threads 316.

According to one embodiment, each thread 316 is allocated a dedicated set of intermediate image buffers in memory to accommodate the required processing. In such an embodiment, the number of threads 316 is used to limit a quantity of the intermediate buffer sets that must be allocated. The more threads 316 that are associated with image task queue 314 will improve processor utilization efficiency, though at the expense of more resource use in the form of intermediate image buffers. Accordingly, use of memory and hardware processing resources may be optimized (e.g., increasing image processing utilization while not exceeding limited resources such as buffer storage in a defined system) for a given hardware configuration by selecting the number of threads in the first task queue.

According to one embodiment, the optimal number of threads in image task queue 314 may be determined based on the amount of memory that must be allocated to each simultaneously processed image, the amount of memory available for the use of a parallel asynchronous image processing engine and the number of hardware processing threads available for use by a parallel image processing engine. Determining and/or selecting the number of threads in the first task queue may be done by host system 110, print controller 140 or sheetside processing 220.

Alternatively, the number of threads may be received from a user interface 230 at print controller 140 corresponding to the aforementioned elements. Alternatively, the number of threads may be stored and/or retrieved from memory corresponding to the aforementioned elements. In one embodiment, image manager 310 sets the number of threads in the first task queue to not exceed a numerical limit.

In one embodiment, each image manager task, when executed by an image thread 316, generates a set of stripe image components corresponding to an image to which the task is associated. Stripe processing 320 receives each set of stripe image components and stores the components in a stripe task queue 324 (e.g., second task queue) for processing by stripe threads 326 (e.g., second set of processing threads). In such an embodiment, task queue 324 is a collection of distinct task queues such that there is a unique task queue 324 for each image thread 316 associated with the image task queue 314.

In a further embodiment, stripe task queue 324 is similar to image task queue 314 (e.g., implemented using task queue 400 shown in FIG. 4A). In a further embodiment, stripe threads 326 are implemented using processing threads 450 structure shown in FIG. 4B and operate as worker threads to process the stripe image components.

According to one embodiment, stripe task queue 324 have a nested relationship with image task queue 314. In such an embodiment, each of the stripe tasks stored at stripe task queue 324 for execution by stripe threads 326 correspond to an image task being executed by an image thread 316. Thus, the image thread 316 executing the image task may be referred to as a "parent" thread, while stripe threads 326 executing the stripe tasks may be referred to as a "child" thread.

In one embodiment, the stripe tasks are processed in parallel by stripe threads 326. Similar to image manager tasks discussed above, execution of stripe tasks by stripe threads 326 are initiated in an order received at stripe task queue 324. However due to the parallel processing, the stripe tasks are not guaranteed to be completed in order. Accordingly, stripe processing 320 performs thread synchronization tasks, which have been enqueued after all stripe processing tasks within the sheetside by image threads 316, one for each of the stripe processing threads within the stripe task queue 324. In such an embodiment, an image task creates a synchronization barrier 327 after enqueueing all of the stripe tasks necessary to process the image.

In one embodiment, synchronization barrier 327 provides a barrier at which each stripe thread 326 that finishes processing must wait until all other stripe threads 326 reach the synchronization barrier 327. Thus, synchronization barrier 327 determines that the processing of the first set of stripe tasks is complete. In such an embodiment, synchronization barrier 327 is created for the corresponding number of stripe threads 326 or the number of stripe threads 326 plus one (e.g., nthreads+1).

In a further embodiment, the image thread 316 enqueues one synchronization task for each stripe thread and then itself executes a synchronization task, so that ultimately together nthreads+1 synchronization tasks are executed, which is the number that the barrier implements in order to release all the threads. In a further embodiment, image manager 310 transmits a "side done" message to sheet side processing 220 upon completion of synchronization to indicate that processing of all stripe components within the full sheet side has been completed.

Once synchronization barrier 327 has been created, stripe processing 320 generates synchronization (or sync) tasks that are inserted into stripe task queue 324. In one embodiment, the number of sync tasks 328 inserted into stripe task queue 324 equals the number of stripe threads 326 (e.g., nthreads). In yet a further embodiment, stripe processing 320 may also generate metadata structures prior to performing the thread synchronization process.

Metadata structures contain descriptive information about data which has been processed, such as a sheet side number and processing parameters and options that were used, and a description of any processing errors. Metadata structures typically comprise the payload of an inter process message that is sent from the image thread to the client process (e.g., sheetside processing 220 or halftoning module 214) when processing of a sheet side is complete, because they are a description of the processing just finished. The metadata structures are useful for routing finished data to its proper destination and to facilitate accurate record keeping about which data have been successfully processed and, if errors occur, which data were not successfully processed.

Upon retrieving a sync task 328 from stripe task queue 324, each stripe thread 326 that finishes processing waits once encountering synchronization barrier 327. Once the synchronization barrier 327 has been satisfied (e.g., determine that corresponding stripe threads 326 have finished processing), the set of processed image stripe image components are returned to image manager 310 and an image thread 316, which is itself awaiting synchronization, may then send the side complete message to the client process, and then retrieve and process a subsequent image task in image task queue 314, if any are remaining. As a result, the image thread 316 may process the next image task by generating another set of stripe image components to be processed by stripe processing 320, as discussed above.

According to one embodiment, image manager 310 may process images in parallel. In such an embodiment, one or more image threads 316 may process one or more subsequent image tasks stored in image task queue 314 during processing of first image. Thus, two or more sets of stripe image components may be processed by stripe threads 326 at any given time. In a further embodiment, an execution priority of the stripe threads 326 are configured high relative to that of image threads 316 to ensure that sheetsides are finished as expeditiously as possible, once they are started, given available hardware processors.

Thus, in the event of limited processing resources, the processing of stripe components within an already-started image is prioritized over starting to process additional images. This is useful because the printing system outputs finished images in order. Diverting resources from completion of an earlier image in order to start a later one is therefore never desirable.

Figure 5A:
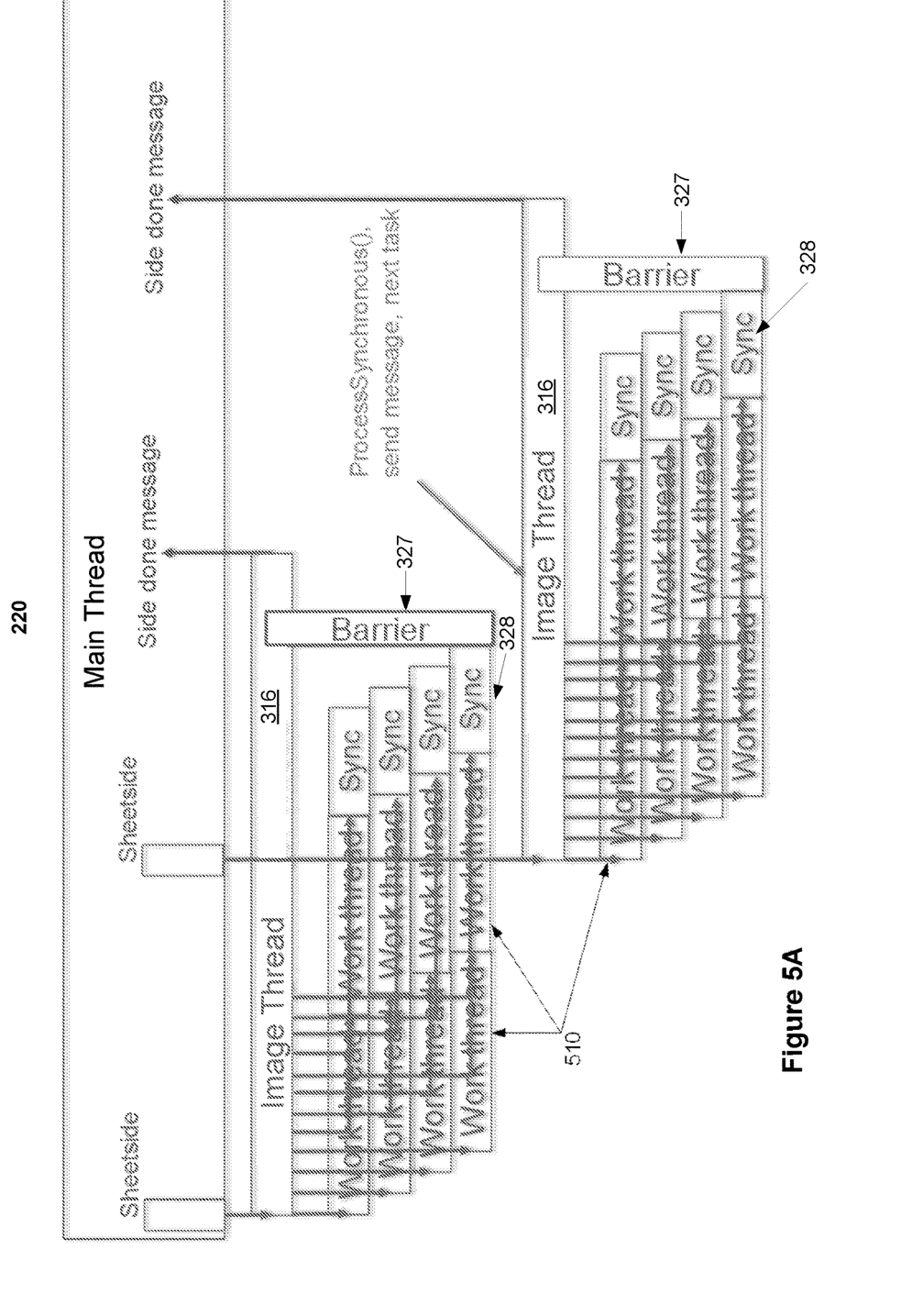
FIG. 5A illustrates another embodiment of a sheetside processing mechanism.

FIG. 5A illustrates another embodiment of a sheetside processing 220. As shown in FIG. 5A, an image thread 316 is processing multiple sheetsides via stripe processing worker threads 510 as time progresses left to right. Additionally, corresponding synchronization barrier 327 and sync tasks 328 are included to perform synchronization. According to one embodiment, the image thread 316 transmits the "side done" message to the client thread (e.g., sheetside processing 220 or halftoning module 214) once synchronization has been completed. In one embodiment, the "side done" message includes metadata describing the work that has been performed.

Figure 5B:
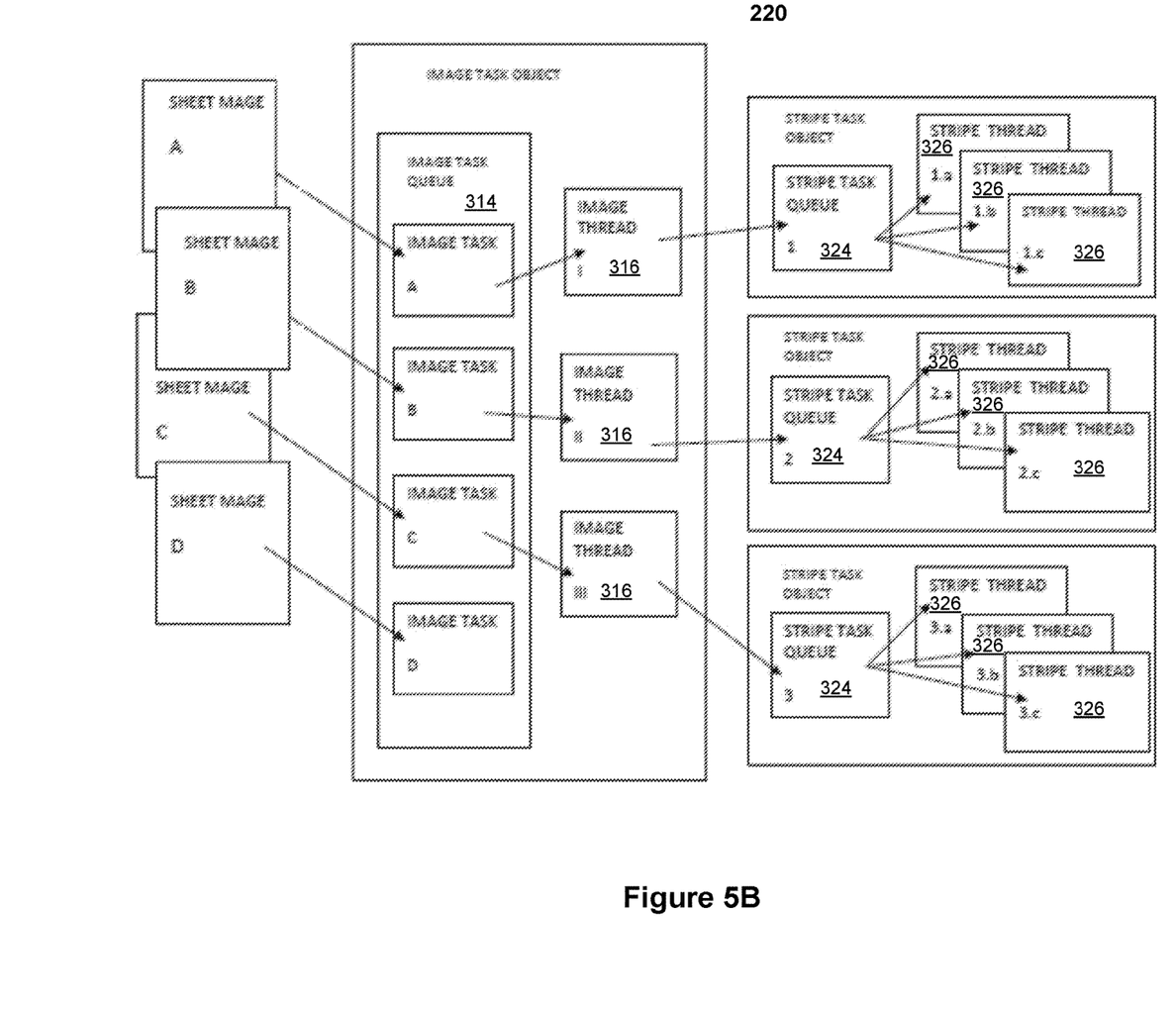
FIG. 5B illustrates yet another embodiment of a sheetside processing mechanism.

FIG. 5B illustrates a process flow for sheetside processing 220. As shown in FIG. 5B, there is a one-to-one correspondence of a sheet image to an image task and a separate one-to-one correspondence between image threads 316 and stripe task queues 324. Further, an image task D waits to be executed by an image thread 316 after another image task has completed. Stripe Task Queues each have the same number of stripe execution threads for practical purposes. However this may not be required in other embodiments.

Figure 6:
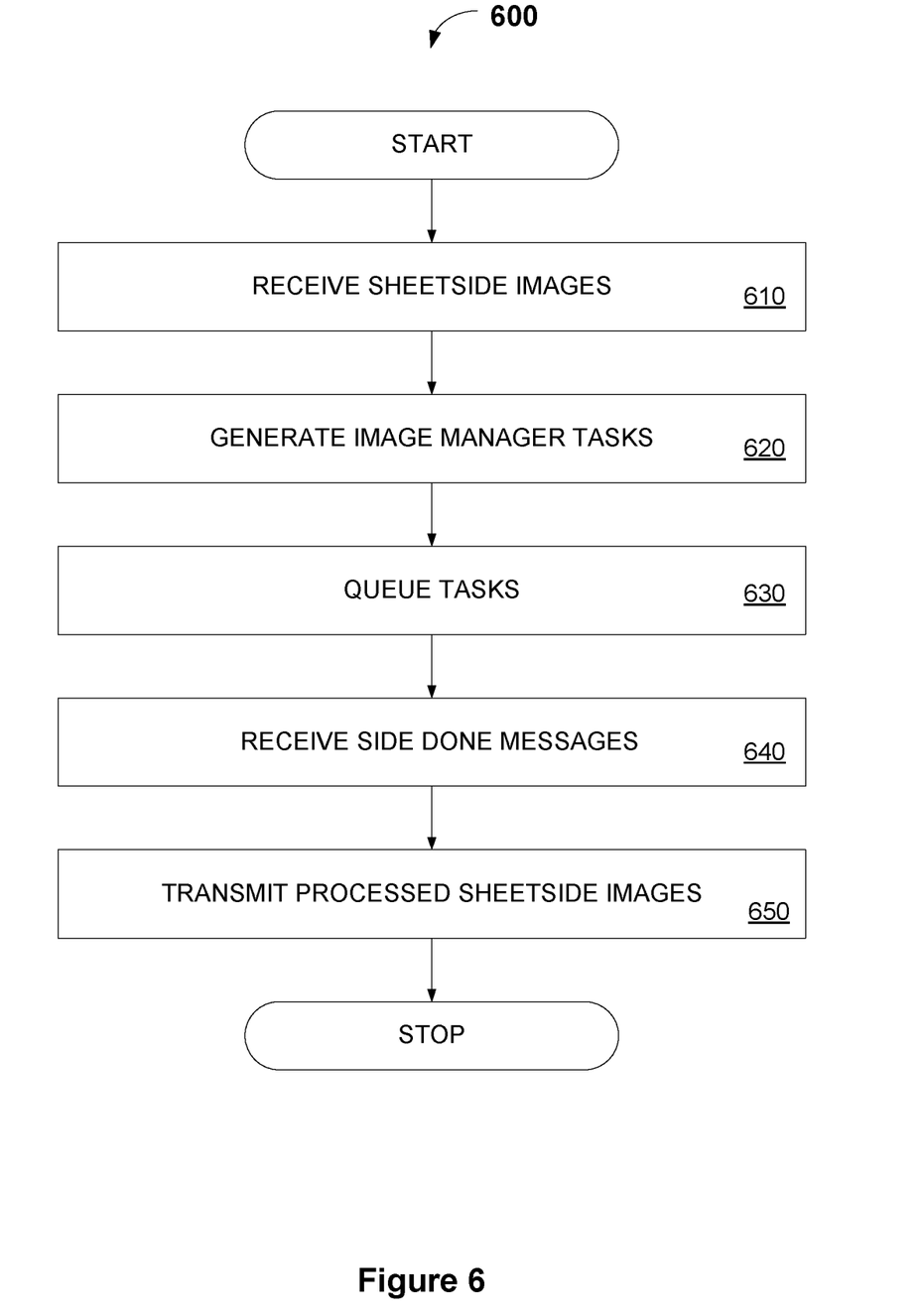
FIG. 6 is a flow diagram illustrating one embodiment for processing sheetside images.

FIG. 6 is a flow diagram illustrating one embodiment of a process 600 for performing sheetside image processing. Process 600 may be performed by processing logic that may comprise hardware (e.g., circuitry, dedicated logic, programmable logic, etc.), software (such as instructions run on a processing device), or a combination thereof. In one embodiment, process 600 may be performed by sheetside processing 220. In a different embodiment, process 600 may be alternatively or additionally performed by halftone process 214. The process 600 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

Process 600 begins at processing block 610, where sheetside images are received in print data to be printed. At processing block 620, image manager tasks are generated for each sheetside image. At processing block 630, the image manager tasks are inserted into an image task queue. Subsequently, each of the image manager tasks are processed by one of a plurality of image threads. As discussed above, the processing of each image manager task is executed by an image task thread to generate a set of stripe components associated with the image.

At processing block 640, one or more "side done" messages may be received, indicating a completion of the processing of one or more associated images. At processing block 650, the processed sheetside images are transmitted for further processing. In one embodiment, the processed sheetside images may be forwarded for halftoning at halftoning module 214. In such an embodiment, the processing that is performed may be a decompression of compressed sheetsides, which are subsequently forwarded for halftoning. In another embodiment, the processed images may be decrypted sheetside images that are forward for decompression image processing, where the sheetside images are again processed via process 600.

Figure 7:
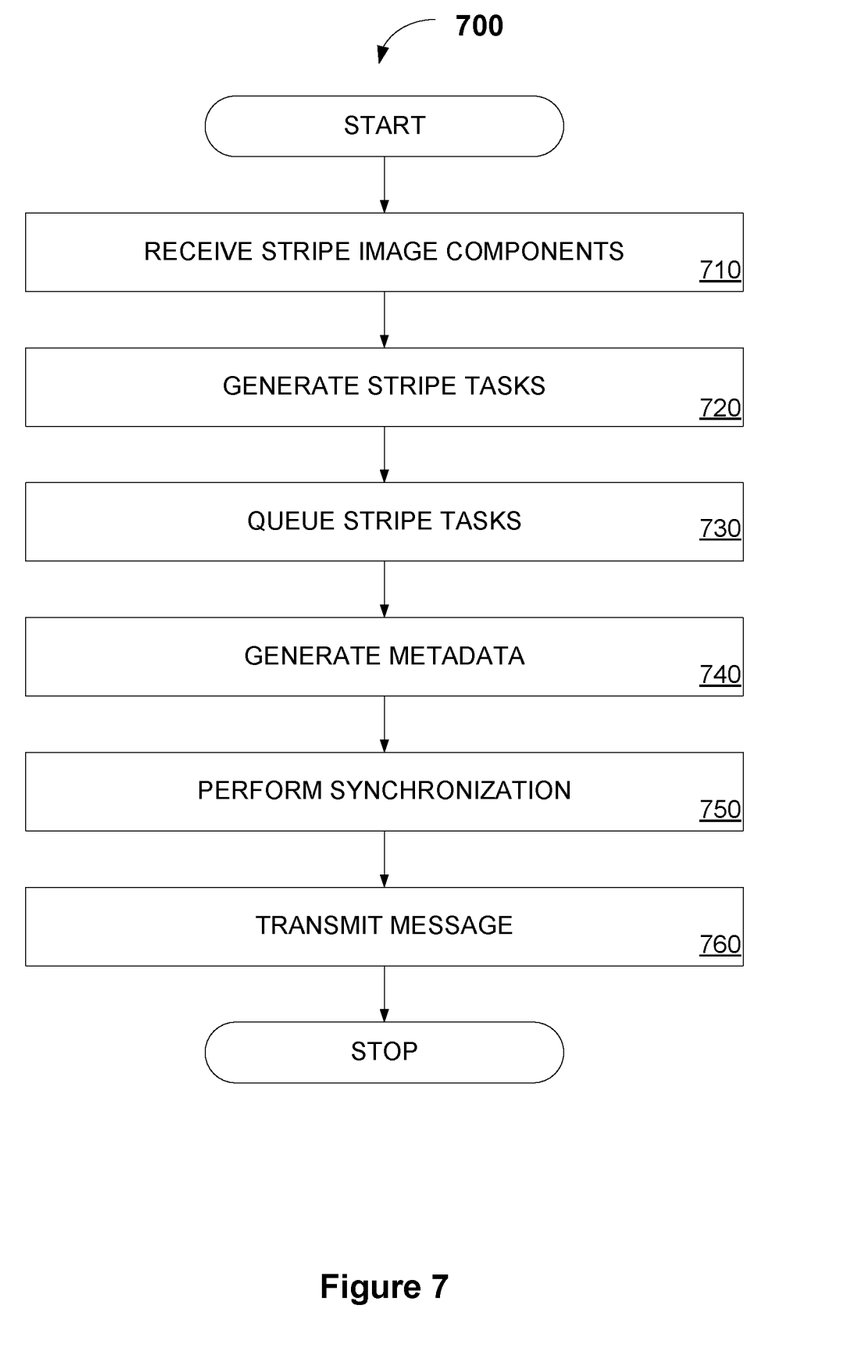
FIG. 7 is a flow diagram illustrating one embodiment for processing an image manager task.

FIG. 7 is a flow diagram illustrating one embodiment of a process 700 for processing an image manager task. Process 700 may be performed by processing logic that may comprise hardware (e.g., circuitry, dedicated logic, programmable logic, etc.), software (such as instructions run on a processing device), or a combination thereof. In one embodiment, process 700 may be performed by sheetside processing 220. The process 700 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-6 are not discussed or repeated here.

Process 700 begins at processing block 710, where stripe image components associated with an image task corresponding to an image are received. At processing block 720, a stripe task is generated for each of the stripe image components. At processing block 730, the stripe tasks are inserted into a stripe task queue 324. Subsequently, the stripe tasks are executed by the stripe threads. At processing block 740, metadata structures that describe the processing work accomplished are created during the execution of the stripe threads. At processing block 750, synchronization processing is performed. At processing block 760, a "side done" message, which may include the metadata, is transmitted upon synchronization being completed, indicating a completion of the processing of the stripe image components.

Figure 8:
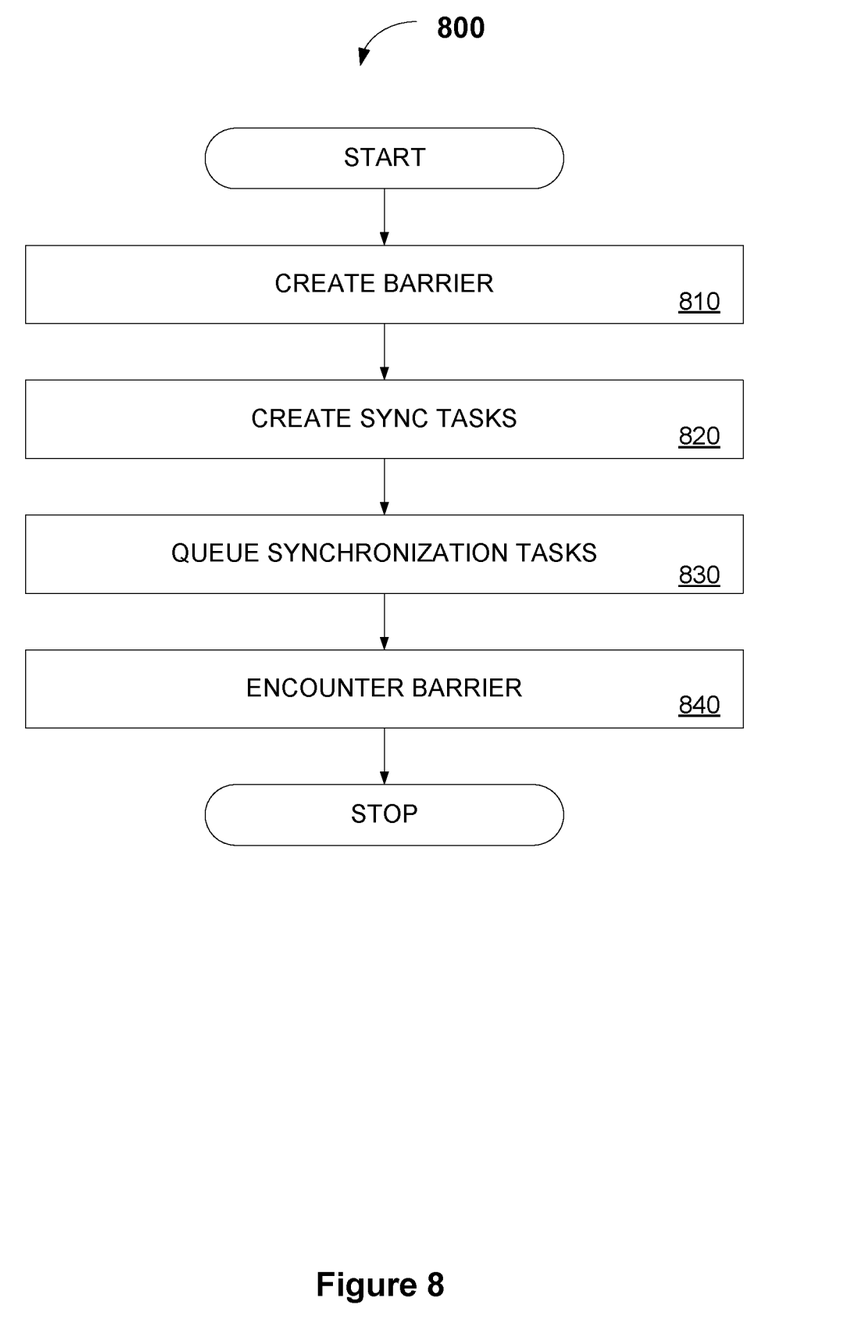
FIG. 8 illustrates is a flow diagram illustrating one embodiment for performing synchronization.

FIG. 8 is a flow diagram illustrating one embodiment of a process 800 for processing synchronization processing. Process 800 may be performed by processing logic that may comprise hardware (e.g., circuitry, dedicated logic, programmable logic, etc.), software (such as instructions run on a processing device), or a combination thereof. In one embodiment, process 800 may be performed by sheetside processing 220. The process 800 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-7 are not discussed or repeated here.

Process 800 begins at processing block 810, where a synchronization barrier 327 is created. At processing block 820, sync tasks 328 are created. At processing block 830, the sync tasks 328 are inserted into the stripe task queue 324. As discussed above, each stripe thread waits for the synchronization barrier 327 upon retrieving a sync task 328 from the stripe task queue 324. At processing block 840, the synchronization barrier 327 is encountered and satisfied, which results in the completion of the synchronization process.

Figure 9:
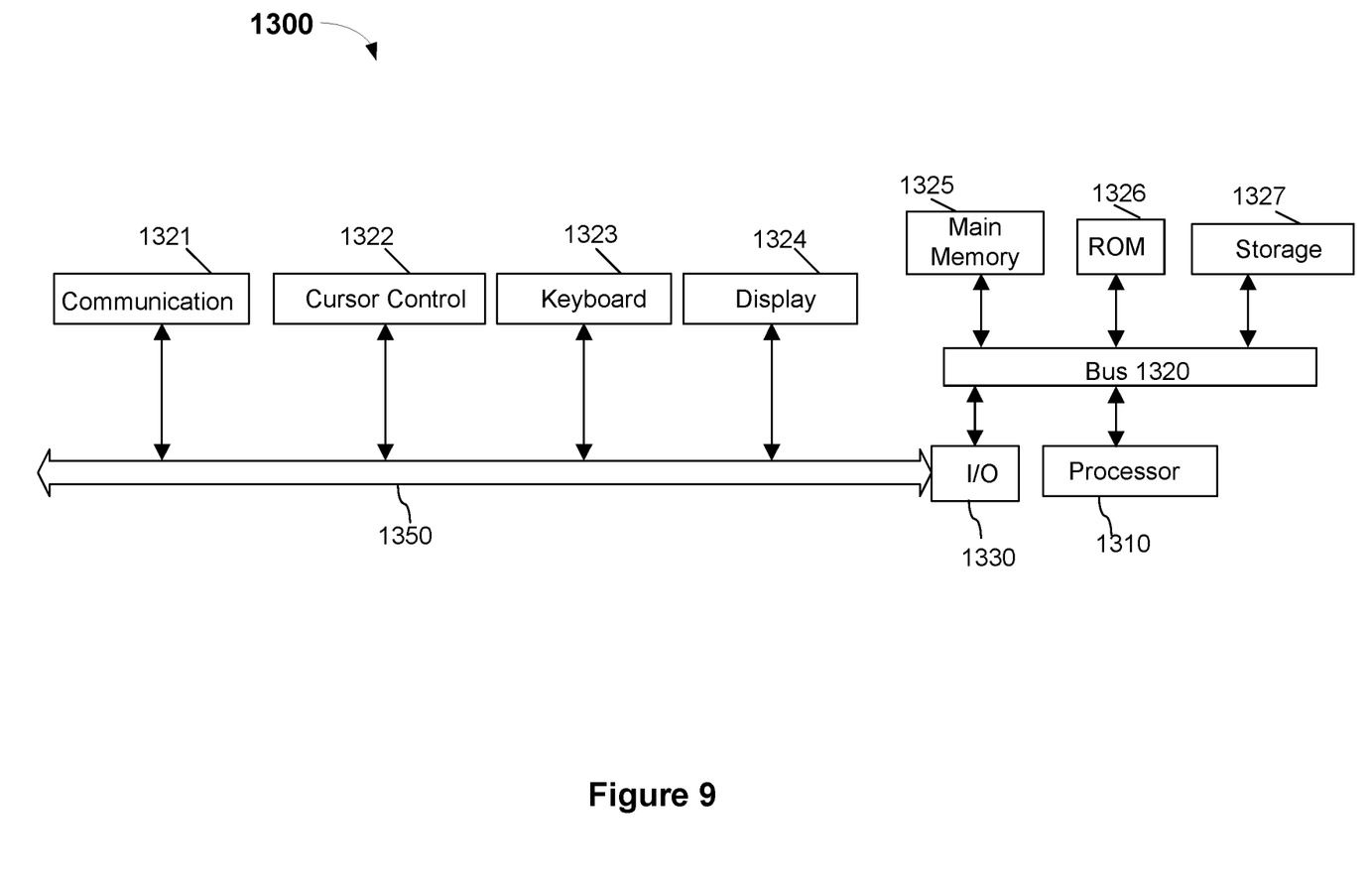
FIG. 9 illustrates one embodiment of a computer system.

FIG. 9 illustrates a computer system 1300 on which printing host 110, printing system 130 and/or print controller 140 may be implemented. Computer system 1300 includes a system bus 1320 for communicating information, and a processor 1310 coupled to bus 1320 for processing information.

Computer system 1300 further comprises a random access memory (RAM) or other dynamic storage device 1325 (referred to herein as main memory), coupled to bus 1320 for storing information and instructions to be executed by processor 1310. Main memory 1325 also may be used for storing temporary variables or other intermediate information during execution of instructions by processor 1310. Computer system 1300 also may include a read only memory (ROM) and or other static storage device 1326 coupled to bus 1320 for storing static information and instructions used by processor 1310.

A data storage device 1327 such as a magnetic disk or optical disc and its corresponding drive may also be coupled to computer system 1300 for storing information and instructions. Computer system 1300 can also be coupled to a second I/O bus 1350 via an I/O interface 1330. A plurality of I/O devices may be coupled to I/O bus 1350, including a display device 1324, an input device (e.g., a keyboard 1323 (e.g., alphanumeric input device) and or a cursor control device 1322). The communication device 1321 is for accessing other computers (servers or clients). The communication device 1321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
    at least one physical memory device having a plurality of task queues; and
    a processor to receive print data including a plurality of sheetside images, and process one or more of the plurality of sheetside images in parallel via nested task queues, the nested task queues including a first task queue associated with a first set of processing threads and second set of task queues, each associated with a second set of processing threads, each task queue in the second set of task queues corresponding to a thread within the first set of processing threads, wherein execution of tasks via the second set of task queues has a higher priority designation than execution of tasks via the first set of processing threads, which are in the first task queue.

2. The system of claim 1, wherein the processor processing the plurality of sheetside images further comprises generating an image manager task for each of the plurality of images, storing each of the image manager tasks in the first task queue and processing the image manager tasks via the first set of processing threads.

3. The system of claim 2, wherein the processor processing of each of the image manager tasks comprises generating a corresponding set of stripe image components, a corresponding set of stripe tasks and storing the corresponding set of stripe tasks in a first of the second set of task queues.

4. The system of claim 2, wherein the processor processing the plurality of sheetside images further comprises processing a first image associated with a first of the image manager tasks stored in the first task queue, including generating a first set of stripe image components of the first image, generating a first set of stripe tasks corresponding to each stripe image component in the first set of stripe image components, storing the first set of stripe tasks in a first of the second set of task queues corresponding to a first task queue thread that is executing the first of the image manager tasks, and processing the first set of stripe tasks via the second set of processing threads.

5. The system of claim 4, wherein the processor processing the first image further comprises creating one or more metadata structures during processing of the first set of stripe tasks, creating one or more synchronization barrier tasks and storing the one or more synchronization barrier tasks in the first of the second set of task queues.

6. The system of claim 5, wherein the processor processing the first image executes the one or more synchronization barrier tasks, completion of which the synchronization barrier is used by the processor processing the first image to determine that the processing of the first set of stripe tasks is complete.

7. The system of claim 6, wherein the processor processing the first image further comprises receiving processed data corresponding to the first set of stripe tasks from the second set of threads upon detecting that the one or more synchronization barrier tasks have determined that the processing of the first set of stripe tasks is complete.

8. The system of claim 7, wherein the processor processing the plurality of sheetside images further comprises processing a second image associated with a second of the image manager tasks stored in the first task queue during processing of the first image manager task.

9. The system of claim 8, wherein the processor processing the second image task comprises generating a second set of stripe image components of the second image, generating a second set of stripe tasks corresponding to each stripe image component in the second set of stripe image components, storing the second set of stripe tasks in the second of the second set of task queues corresponding to a first task queue thread that is executing the second of the image manager tasks, and processing the second set of stripe tasks via the second set of processing threads.

10. The system of claim 8, wherein the processor processing the plurality of sheetside images further comprises processing a third image associated with a third of the image manager tasks stored in the first task queue upon receiving the processed data corresponding to the first set of stripe tasks.

11. The system of claim 1, further comprising a printer to print the plurality of sheetside images.

12. At least one computer readable medium having instructions stored thereon, which when executed by one or more processors, cause the processors to:
    receive print data including a plurality of sheetside images; and
    process two or more of the plurality of sheetside images in parallel via nested task queues, the nested task queues including a first task queue associated with a first set of processing threads and second set of task queues associated with a second set of processing threads corresponding to a thread in the first set of processing threads, wherein execution of tasks via the second set of processing threads has a higher priority designation than execution of tasks via the first set of processing threads.

13. The computer readable medium of claim 12, wherein processing the plurality of sheetside images further comprises:
    generating an image manager task for each of the plurality of images;
    storing each of the image manager tasks in the first task queue; and
    processing the image manager tasks via the first set of processing threads.

14. The computer readable medium of claim 13, wherein processing of each of the image manager tasks comprises:
    generating a corresponding set of stripe image components, a corresponding set of stripe tasks; and
    storing the corresponding set of stripe tasks in a first of the second set of task queues.

15. The computer readable medium of claim 14, wherein processing the plurality of sheetside images further comprises processing a first image associated with a first of the image manager tasks stored in the first task queue, including:
    generating a first set of stripe image components of the first image;
    generating a first set of stripe tasks corresponding to each stripe image component in the first set of stripe image components;
    storing the first set of stripe tasks in a first of the second set of task queues corresponding to a first task queue thread that is executing the first of the image manager tasks; and
    processing the first set of stripe tasks via the second set of processing threads.

16. The computer readable medium of claim 15, wherein the processor processing the first image further comprises:
    creating one or more metadata structures during processing of the first set of stripe tasks;
    creating a one or more synchronization barrier tasks, wherein the one or more synchronization barrier tasks determines that the processing of the first set of stripe tasks is complete; and storing the one or more synchronization barrier tasks in the first of the second set of task queues.

17. A method comprising:
receiving print data including a plurality of sheetside images; and
processing two or more of the plurality of sheetside images in parallel via nested task queues, the nested task queues including a first task queue associated with a first set of processing threads and second set of task queues associated with a second set of processing threads corresponding to a thread in the first set of processing threads, wherein execution of tasks via the second set of processing threads has a higher priority designation than execution of tasks via the first set of processing threads.

18. The method of claim 17, wherein processing the plurality of sheetside images further comprises:
generating an image manager task for each of the plurality of images;
storing each of the image manager tasks in the first task queue; and
processing the image manager tasks via the first set of processing threads.

19. The method of claim 18, wherein processing an image manager task comprises:
generating a corresponding set of stripe image components, a corresponding set of stripe tasks; and
storing the corresponding set of stripe tasks in a first of the second set of task queues corresponding to the image thread which is executing the image manager task.

20. The method of claim 19, wherein processing the plurality of sheetside images further comprises processing a first image associated with a first of the image manager tasks stored in the first task queue, including:
generating a first set of stripe image components of the first image;
generating a first set of stripe tasks corresponding to each stripe image component in the first set of stripe image components;
storing the first set of stripe tasks in the first of the second set of task queues corresponding to a first task queue thread that is executing the first of the image manager tasks; and
processing the first set of stripe tasks via the threads of the first of the second set of task queues.

* * * * *